Nov. 27, 1956  S. C. HETH ET AL  2,771,731
PICKING ROLLS WITH CLEARING BEATER
Filed April 21, 1949  2 Sheets-Sheet 1
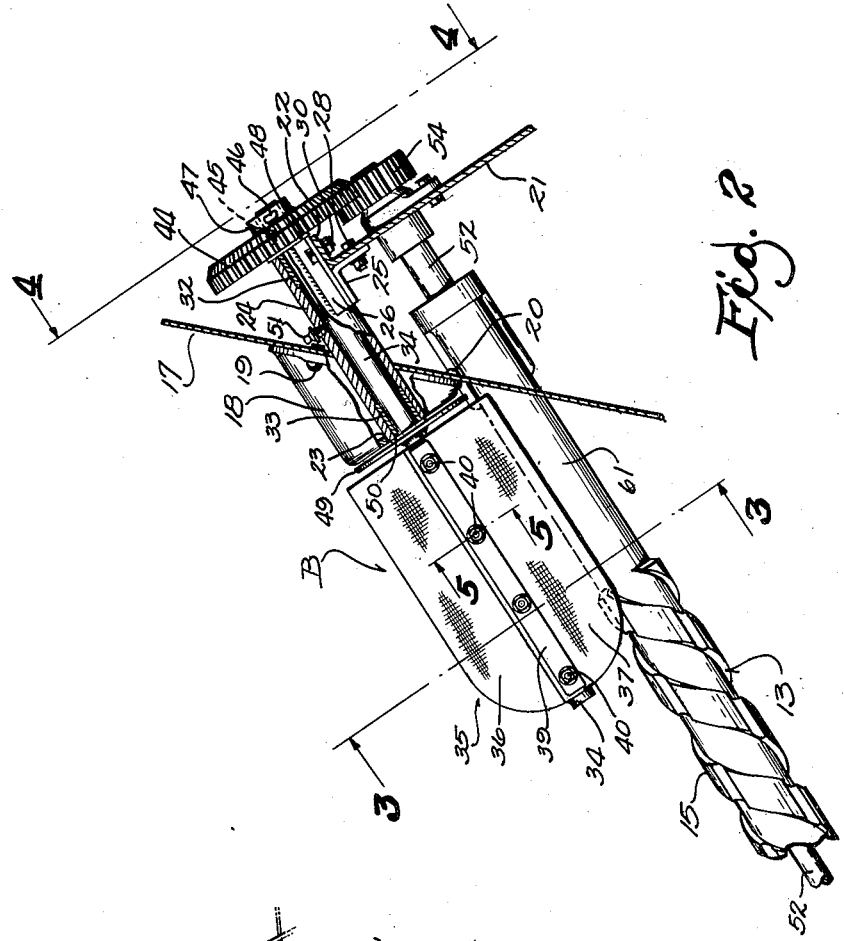
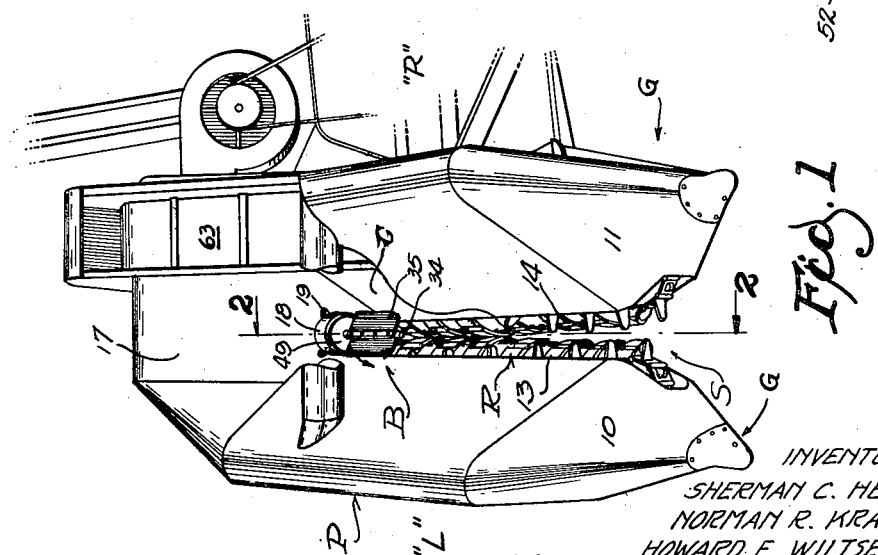
INVENTORS.
SHERMAN C. HETH
NORMAN R. KRAUSE
HOWARD E. WILTSEY
BY
AGENT.

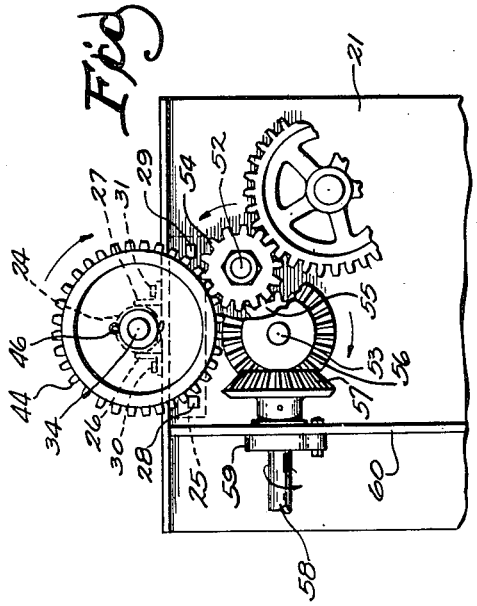

United States Patent Office 2,771,731
Patented Nov. 27, 1956

2,771,731

PICKING ROLLS WITH CLEARING BEATER

Sherman C. Heth, Norman R. Krause, and Howard E. Wiltsey, Racine, Wis., assignors to J. I. Case Company, Racine, Wis., a corporation of Wisconsin Application April 21, 1949, Serial No. 88,758

8 Claims. (Cl. 56—104)

This invention relates to corn pickers and especially to means for preventing the snapped ears from being unnecessarily nipped by the rolls, which results in premature husking and shelling.

The conventional corn picker has snapping rolls which remove the ears from the stalks. The ears then fall laterally into a chute to be conveyed to a wagon or other storage facility. The above mentioned snapping rolls are so adjusted that the space between them decreases toward the rear of the stalkway so that they substantially make contact with each other in the vicinity of the chute. In general, it has been found that the snapped ears will roll about to a considerable extent at the upper end of the rolls and be prevented from falling into the chute, because of the accumulation of chaff, husks and pieces of stalk, the result being that the closely positioned rolls will nip the husks from the ears and shell off some kernels, owing to the failure of the ears to promptly fall away from the rolls and into the chute. The kernels thus shelled will then fall to the ground and be wasted.

When picking sweet corn in particular with the conventional harvester, it has often been found that husks are nipped from the ears exposing the tender kernels to be bruised or shelled by contact with the snapping rolls. This difficulty arises primarily because the snapped ears are delayed in being removed from the region of the rolls either by the presence of pieces of stalks or husks interfering with the free passage to the disposal chute. As a result the bruised sweet corn spoils if it is not processed within a reasonable time after picking; also the loss occasioned when the ears are bruised or prematurely shelled can be considerable.

Difficulty has also been experienced when picking dry corn, the results being similar to those attending the picking of sweet corn with respect to excessive husking and shelling. A more serious objection to premature husking and shelling arises in some localities where the corn is infested with weevils and corn borers. When the infested ears are deposited in a storage bin it has been the custom to spray or dust them with a poison to combat these pests. However, it is necessary that the husks remain intact when the ears are so treated as any poison that reaches the kernels would be ultimately consumed by the stock and injure them. When so treated there is little danger of poisoning when the ears are finally husked, preparatory to use as feed.

Hybrid corn which grows typically in multiple groups of down-hanging ears having long depending husks is especially troublesome in that the husks are caught along with the stalks between the rolls and are pulled from the ears thus prematurely husking them. The conventional corn harvesters presently available do not have means to prevent the above mentioned difficulties.

An object of this invention is to prevent the rolls from injuring the snapped ears.

Another object is to provide means to remove the ears from the vicinity of the rolls as promptly as possible after they have been snapped from the stalks, thereby clearing the rolls from oncoming ears and stalks.

Another object is to provide means to remove the ears from the rolls without injuring the ears or causing unnecessary shelling.

Another object is to provide an arrangement whereby downhanging ears will be conveyed to the chute without injury.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

When reference is made to left and right, it is understood to mean the positions indicated in Figs. 1, 3, and 6 by reference characters "L" and "R," and facing the implement.

Referring to the drawings,

Fig. 1 shows a fragmentary front view of a corn picker looking into the stalkway and showing the present invention;

Fig. 2 is an enlarged fragmentary view partly in section taken at 2—2 of Fig. 1;

Fig. 3 is a view partly in section taken at 3—3 of Fig. 2;

Fig. 4 is a fragmentary view taken at 4—4 of Fig. 2;

Fig. 5 is an enlarged section taken at 5—5 of Fig. 2 and

Fig. 6 is a fragmentary view of the upper portions of the snapping rolls, taken in the direction of 6—6 of Fig. 3.

Referring to Fig. 1, P is a conventional corn picker having a pair of snapping rolls R and a laterally and downwardly directed chute C for the reception of snapped ears. Conventional gathering points G are provided with a stalkway S between them for the reception of the stalks. Snapping rolls R are positioned in the stalkway S and extend beyond the chute C making substantial contact with each other at the rear of the stalkway S. The present invention in part comprises a beater B in co-operation with the rolls R.

Described specifically, the gathering points G comprise left and right hand members 10 and 11 having the stalkway S between them. Snapping rolls 13 and 14 left and right, respectively, extend upwardly and rearwardly to a point beyond the chute C. Rolls 13 and 14 are rotated clockwise and counterclockwise so as to grip the stalks and force them downwardly. Rolls 13 and 14 are provided with the conventional projections 15 which are usually of spiral form and of left and right hand direction so as to urge the stalks rearwardly as well as downwardly.

Beater arrangement B is secured to the rear panel 17 of the stalkway S and in this instance positioned with the axis thereof parallel to the axis of the rolls 13 and 14. The purpose of beater B is to engage snapped ears and impel them laterally away from the rolls into chute C. In co-operation with beater B is the modified snapping roll 13, and the conventional snapping roll 14. These members will be specifically described below.

Rear panel 17 is conventional and forms the rear wall of the stalkway. A casting 18 Fig. 2 provides a forward support for the beater B, and is secured to wall 17 by bolts 19 and screw 20. Appropriate lugs and holes are provided in casting 18 for this purpose. Referring to Figs. 2 and 4, a gear plate 21 is secured to the rear of wall 17 for the purpose of supporting the bearings for the various shafts. Plate 21 forms part of the frame of the implement, and is placed normal to the axis of the rolls 13 and 14 as shown in Fig. 2. Plate 21 is provided with a portion 22 bent rearwardly at right angles thereto to form a base for the rear end of the beater B.

Casting 18 has provided at the front face thereof a hole 23. A bearing quill 24 is inserted in hole 23 and reaches from the face of casting 18 to a point flush with the edge of portion 22. In order to adequately support quill 24 an angle member 25 is welded or otherwise fixed normally to the axis thereof. A pair of angle members 26 and 27 are positioned one on either side of the quill 24 and fixed thereto. Bolts 28 and 29 secure angle member 25 to plate 21. Bolts 30 and 31 secure angle members 26 and 27 respectively to the portion 22 of plate 21.

Positioned at the ends of quill 24 are bushings 32 and 33 fitted into recesses as shown in Fig. 2. These bushings provide the bearings for a shaft 34 which extends forwardly a sufficient distance to accommodate a beater paddle 35.

Beater paddle 35 comprises a pair of blades or paddles 36 and 37 positioned on opposite sides of shaft 34 to extend tangent thereto and in opposite directions. Blades 36 and 37 in this instance are made of canvas impregnated and covered with rubber and sufficiently thick to deflect the ears laterally without injuring them. This material has been found ideal for the purpose, being durable in addition to having no tendency to injure the kernels. However, there are other materials that may be suitable. The blades must rotate in close proximity to the snapping rolls without danger of damage should they strike the latter, therefore any flexible or yieldable material which is sufficiently durable can be used.

Reinforcing members of metal 38 and 39 serve to clamp the flexible blades 36 and 37 and to support them along their entire length. Four bolts 40 in this instance pass through members 38 and 39 and shaft 34. Flat washers 41 and lock washers 42 complete the assembling of the beater paddle 35, and nuts 43 secure the units together.

A drive gear 44 is keyed to the rear end of shaft 34 as shown by a suitable key 45. A cotter 46 is passed through the hub 47 of gear 44 to prevent the latter from becoming displaced axially. A suitable washer 48 prevents excessive friction between the quill 24 and gear 44.

A combined thrust member and shield 49 is welded or otherwise suitably fixed to shaft 34 adjacent the casting 18. This member is of sufficient diameter to aid in deflecting husks and pieces of stalk laterally with the ears. A thrust washer 50 is positioned intermediate the member 49 and the end of quill 24 and serves to take the thrust due to the rearward pressure of the stalks when they contact the beater. A grease fitting 51 is provided for periodic lubrication.

Rolls 13 and 14 are journalled at the forward end of the stalkway 12 in the conventional manner and extend upwardly and rearwardly and are supported at the rear in bearings in gear plate 21. Shafts 52 and 53 support rolls 13 and 14 respectively and rotate with the latter. A gear 54 is secured to shaft 52 and a gear 55 is secured to shaft 53. Gears 54 and 55 are meshed together so that rolls 13 and 14 rotate toward each other.

A bevel gear 56 is also keyed to shaft 53 and meshes with a bevel gear 57. Bevel gear 57 is keyed to a drive shaft 58 which is journalled in a bearing 59. Bearing 59 is supported in a conventional manner on frame member 60. Shaft 58 extends laterally in this instance to connect with the power source which is conventional and need not be further described.

Gear 44 which drives the beater paddle 35 also meshes with gear 54 as shown in Fig. 4.

Rolls 13 and 14 are of the conventional type having spiral projections 15 as shown in Fig. 6. However, in this invention roll 13 is reduced in diameter for a portion of its length as at 61, to the diameter of the core of the spiral projections 15. This reduction in diameter removes the spiral projections leaving the portion 61 smooth and out of contact with roll 14. This treatment provides a space 62 between the periphery of the spiral 15 of roll 14 and the portion 61 of roll 13. When an ear, which has been snapped from the stalk, reaches the reduced portion 61, there will be no tendency for the rolls to nip the husks or cause shelling because of the space 62 which prevents contact between rolls 13 and 14. The snapped ear will then roll uninjured on the rolls 13 and 14 until struck in a lateral direction by the beater 35 ejecting the ear to the chute C. The ear is then carried by means of a conveyor 63 of a conventional type to a suitable receptacle.

The above being a complete description of an illustrative embodiment of the invention, what is claimed as new and desired to be secured by Letters Patent of the United States is:

1. In a corn harvester provided with a laterally directed chute, a stalkway having a rear panel and left and right hand snapping rolls provided with roll shafts and rotating oppositely to eject stalks downwardly, in combination, a beater adapted to urge snapped ears away from said rolls into said chute comprising a housing secured to said panel adjacent said chute, a beater shaft journaled in said housing the axis thereof being substantially parallel to the axis of said left hand roll, flexible beater paddles secured on opposite sides of said beater shaft adjacent said housing, and adapted to rotate substantially tangent to at least one of said rolls, one of said rolls being of reduced diameter at its discharge end in a region coextensive with the path of rotation of said beater paddles, a thrust member secured to said beater shaft adjacent said housing, a thrust washer intermediate said thrust member and said housing, said left hand roll shaft being rearwardly co-extensive with said beater shaft, means to rotate said beater comprising a pair of power transmitting members, one member being secured to said snapping roll shaft and the other being secured to said beater shaft and means to rotate said left and right hand rolls clockwise and counterclockwise, respectively.

2. In a corn harvester provided with a laterally directed chute, a stalkway having a rear panel and left and right snapping rolls, in combination, a beater secured to said panel and adapted to urge snapped ears laterally from the vicinity of said rolls into said chute comprising a beater shaft journaled for rotation and extending in the general direction of the axes of said rolls, yieldable beater paddles secured to opposite sides of said shaft and adapted to rotate in the proximity of said left hand roll, said left hand roll being reduced in diameter at a region adjacent said panel to avoid nipping snapped ears and means to rotate said beater.

3. In a corn harvester provided with a laterally directed chute, a stalkway having a rear panel and a pair of snapping rolls, in combination, a beater adapted to urge snapped ears laterally from the vicinity of said rolls into said chute comprising a support secured to said panel, a shaft journaled in said support, the said shaft extending forwardly from said support above said snapping rolls, yieldable beater paddles secured to opposed sides of said shaft and adapted to rotate in close proximity to at least one of said rolls, one of said rolls having an ineffective portion of reduced diameter adjacent said beater and means to rotate said beater simultaneously with said rolls.

4. In a corn harvester having a stalkway, a rear panel therein and a laterally positioned disposal chute, in combination, a pair of snapping rolls arranged for rotation in said stalkway for snapping corn ears and making substantial contact adjacent said panel, one of said rolls having a region of reduced diameter in the proximity of said panel, a beater journaled on said panel and having yieldable paddles, the axis thereof extending in the direction of the axes of said rolls, said beater being positioned so as to rotate adjacent said region of reduced diameter to avoid nipping said ears and means to rotate said beater.

5. In a corn harvester having a disposal chute, a pair of snapping rolls for snapping corn ears adapted to make substantial contact in the vicinity of said chute, one of said rolls having a portion of reduced effective diameter and interrupting said contact so said rolls will not nip said ears at a region adjacent said chute, a flexible beater positioned above said portion of reduced diameter and rotatable to urge snapped ears laterally into said chute and means to rotate said beater.

6. In a corn harvester having means defining a stalkway, and a chute leading laterally from said stalkway, a pair of snapping rolls in the stalkway, one adjacent and one remote from said chute, means for preventing husking and shelling of corn ears comprising a rotatable beater having flexible paddles and positioned above the rolls, having an axis extending in the direction of said rolls and rotating in the direction of the roll adjacent to said chute for engaging ears snapped by said snapping rolls and impelling them off the rolls and into the chute substantially as soon as they are snapped, one of said rolls being reduced in diameter in the region of said beater to provide clearance between it and the other roll so that ears being acted on by the beater will be free from engagement by the rolls and will remain intact while the ears are impelled into said chute by said beater.

7. In a corn harvester having a pair of snapping rolls and a conveyor, a beater positioned adjacent said rolls and adapted to urge snapped ears laterally into said conveyor comprising a shaft journaled for rotation, flexible beater blades secured to said shaft, one of said snapping rolls being reduced in effective diameter at a region adjacent the path of rotation of said beater blades so as to prevent said rolls from nipping snapped ears.

8. In a corn harvester having a pair of snapping rolls and a laterally directed chute, a beater positioned adjacent said rolls and said chute comprising a shaft journaled for rotation, means to rotate said shaft, yieldable beater blades secured to said shaft, one of said snapping rolls being reduced in diameter at a region coextensive with the path of rotation of said beater blades, rendering said roll ineffective at said region.

References Cited in the file of this patent

UNITED STATES PATENTS

| | | |
|---|---|---|
| 1,049,400 | Rollins et al. | Jan. 7, 1913 |
| 1,821,985 | Peterson | Sept. 8, 1931 |
| 1,906,692 | Lindgren et al. | May 2, 1933 |
| 2,229,628 | Anderson | Jan. 28, 1941 |
| 2,234,447 | Norman | Mar. 11, 1941 |
| 2,440,791 | Welty | May 4, 1948 |